(12) United States Patent
Yu et al.

(10) Patent No.: US 6,529,551 B1
(45) Date of Patent: Mar. 4, 2003

(54) DATA EFFICIENT QUANTIZATION TABLE FOR A DIGITAL VIDEO SIGNAL PROCESSOR

(75) Inventors: Haoping Yu, Indianapolis, IN (US); Barth Alan Canfield, Indianapolis, IN (US); Billy Wesley Beyers, Jr., Greenfield, IN (US); Wai-man Lam, Mohegan Lake, NY (US)

(73) Assignee: Thomson Licensing S.A., Boulogne Cedex (FR)

( * ) Notice: Subject to any disclaimer, the term of this patent is extended or adjusted under 35 U.S.C. 154(b) by 719 days.

(21) Appl. No.: 08/911,526

(22) Filed: Aug. 12, 1997

Related U.S. Application Data

(60) Provisional application No. 60/032,541, filed on Dec. 10, 1996.

(51) Int. Cl.[7] .................................................. H04N 7/18
(52) U.S. Cl. .............................. 375/240.03; 375/240.05; 341/67; 341/61
(58) Field of Search ................................. 348/384, 390, 348/391, 399, 400, 443, 445, 408, 419, 423, 404, 403, 402, 845.1, 845.2, 416, 415; 341/51, 67, 76, 61; 382/232, 253; 375/240, 240.03–240.07

(56) References Cited

U.S. PATENT DOCUMENTS

| | | | |
|---|---|---|---|
| 4,422,094 A | | 12/1983 | Lewis, Jr. et al. ............ 358/37 |
| 5,057,917 A | | 10/1991 | Shalkauser et al. ......... 358/135 |
| 5,339,164 A | * | 8/1994 | Lim ............................ 348/390 |
| 5,541,594 A | * | 7/1996 | Huang et al. ................ 348/414 |
| 5,541,595 A | | 7/1996 | Meyer ........................ 341/67 |
| 5,682,152 A | * | 10/1997 | Wang et al. ................. 348/403 |
| 5,784,494 A | * | 7/1998 | Strongin et al. ............ 382/233 |
| 5,796,743 A | * | 8/1998 | Bunting et al. ............. 348/384 |
| 5,818,530 A | * | 10/1998 | Canfield et al. ............. 348/400 |
| 5,828,426 A | * | 10/1998 | Yu .............................. 348/426 |
| 5,850,482 A | * | 12/1998 | Meany et al. ............... 382/232 |
| 5,909,513 A | * | 6/1999 | Liang et al. ................ 382/232 |
| 6,009,203 A | * | 12/1999 | Liu et al. .................... 382/233 |

FOREIGN PATENT DOCUMENTS

| | | | |
|---|---|---|---|
| EP | 0535571 A2 | 4/1993 | ............ H04N/1/41 |
| EP | 0616471 A2 | 9/1994 | ............ H04N/7/133 |
| EP | 0627858 A2 | 12/1994 | ............ H04N/7/13 |
| EP | 0660612 A2 | 6/1995 | ............ H04N/7/24 |
| EP | 0720376 A2 | 7/1996 | ............ H04N/7/26 |
| WO | WO95/34991 | 12/1995 | ............ H04N/7/04 |

OTHER PUBLICATIONS

"Video compression makes big gains", by Peng H. Ang, Peter A. Ruetz, and David Auld—LSI Logic Corp., IEEE Spectrum—Oct., 1991, pp. 16–19.

"Fundamentals of Digital Image Processing", by Anil K. Jain, pp. 476–498, Prentice–Hall International, Inc.

"Principles of Digital Audio", Third Edition, by Ken C. Pohlmann, pp. 356–357, McGraw–Hill, Inc.

* cited by examiner

*Primary Examiner*—Andy Rao
(74) *Attorney, Agent, or Firm*—Joseph S. Tripoli; Joseph J. Laks; Ronald H. Kurdyla

(57) ABSTRACT

An MPEG coded and compressed video signal is received and decompressed for display. Prior to storing frames required for motion compensation in memory, pixel blocks are recompressed into DPCM prediction error values to reduce bandwidth and frame memory requirements. Fixed length quantization and dequantization tables (FIG. 2) have N levels (e.g., 15 levels), and each level has an associated output symbol of predominantly M bits (e.g., 4 bits), except that at least one of said N levels (e.g., level 7) is defined by a unique short symbol having less than M bits (e.g., 3 bits), and input data for that level is received at a desired rate. Each time a short symbol is used to represent a data value, bandwidth and memory are reduced and/or preserved for other uses, for example, inserting overhead data into a fixed-size data stream. For large sequences of data, such as exists for video data for example, the reduction in memory and bandwidth is significant.

18 Claims, 2 Drawing Sheets

| Level Index | Decision Point | Reconstruction Level | Quantization Output Codeword Symbol |
|---|---|---|---|
| 0 | -50 | -57 | 0000 |
| 1 | -39 | -45 | 0001 |
| 2 | -29 | -34 | 0010 |
| 3 | -20 | -25 | 0011 |
| 4 | -13 | -17 | 0100 |
| 5 | -7 | -10 | 0101 |
| 6 | -2 | -5 | 0110 |
| 7 | 3 | 0 | 0111 |
| 8 | 8 | 5 | 1000 |
| 9 | 14 | 10 | 1001 |
| 10 | 21 | 17 | 1010 |
| 11 | 30 | 25 | 1011 |
| 12 | 40 | 34 | 1100 |
| 13 | 51 | 45 | 1101 |
| 14 | 63 | 57 | 1110 |

FIGURE 1
PRIOR ART

| Level Index | Decision Point | Reconstruction Level | Quantization Output Codeword Symbol |
|---|---|---|---|
| 0 | -50 | -57 | 1110 |
| 1 | -39 | -45 | 1100 |
| 2 | -29 | -34 | 1010 |
| 3 | -20 | -25 | 1000 |
| 4 | -13 | -17 | 0110 |
| 5 | -7 | -10 | 0100 |
| 6 | -2 | -5 | 0010 |
| 7 | 3 | 0 | 000 |
| 8 | 8 | 5 | 0011 |
| 9 | 14 | 10 | 0101 |
| 10 | 21 | 17 | 0111 |
| 11 | 30 | 25 | 1001 |
| 12 | 40 | 34 | 1011 |
| 13 | 51 | 45 | 1101 |
| 14 | 63 | 57 | 1111 |

FIGURE 2

DATA EFFICIENT QUANTIZATION TABLE FOR A DIGITAL VIDEO SIGNAL PROCESSOR

This application claims priority from a provisional application, serial No. 60/032,541, filed Dec. 10, 1996, by Yu et al.

FIELD OF THE INVENTION

This invention concerns compression/decompression networks. Specifically, the invention concerns modifying the characteristics of compression/decompression tables to facilitate data throughput and memory efficiency.

BACKGROUND OF THE INVENTION

Codeword resolution is important to accurately reconstruct coded data. Fixed-length quantization lookup tables allow a compression network to efficiently quantize and dequantize data using minimal processing. Quantization tables using a greater number of bits to represent output codewords allow better resolution than tables using a fewer number of bits to represent output codewords. However, more bits require more memory for storing the data after quantization and a greater bandwidth to transfer the same data. Quantization tables are lossy in that, for a given quantization level, they compress several input data points of approximately the same value to one output value. During reconstruction, the same dequantized value represents all data points within the resolution of a particular quantization level of the table. Data discrepancy depends upon the resolution of the table employed to compress and decompress the data. Known fixed-length quantization tables exhibit a number of levels dictated by the number of bits used to represent the output codewords, and all codewords are represented by the same number of bits within a given table. For example, a table with three-bit output codewords has eight levels ($2^3$), and a four-bit table has sixteen levels ($2^4$). The average resolution of the table, and generally of each level, is the domain of the table divided by the number of levels in the table.

SUMMARY OF THE INVENTION

In quantization tables, output quantized data are represented by multiple-bit words, or symbols. It is herein recognized that for certain types of data, quantization tables employing symbols with less than the predominant number of bits per symbol for at least one quantization level can significantly reduce bandwidth and memory requirements. In accordance with the principles of the present invention, compression and decompression tables have N levels associated with respective symbols of predominantly M bits, except that at least one level receiving values at a known general rate is compressed with a symbol having less than M bits.

A BRIEF DESCRIPTION OF THE DRAWINGS

FIG. 1 shows a four-bit quantization table according to the prior art.

FIG. 2 shows a four-bit quantization table according to the principles of the present invention.

DETAILED DESCRIPTION OF THE PREFERRED EMBODIMENT

Figure 3:
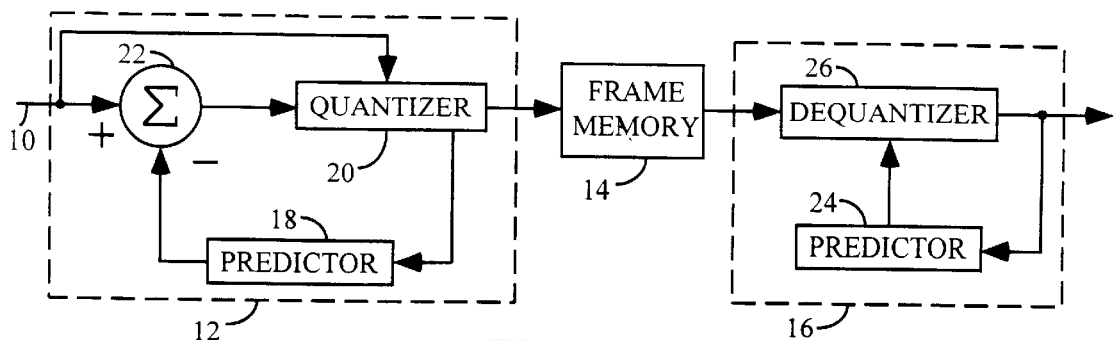
FIG. 3 shows a block diagram of a compression/decompression network which may employ the present invention.

In an exemplary embodiment, each one of 15 quantization table levels is associated with a four-bit output codeword symbol, except for level seven which is associated with frequently occurring input data. In this case, a three-bit symbol is used. Each time a short symbol is used, bandwidth and memory are preserved for other uses. For large sequences of data, such as exists for video data for example, the reduction in memory and bandwidth is significant. The invention also pertains to dequantization tables.

The quantization table defined above is a hybrid, bi-length table. Depending upon the number of bits used to represent codewords, multiple table levels may be selected to produce the desired bandwidth reduction. Instead of a bi-length table, the hybrid table would be an N-length table, N being the number of levels having short codewords. Also, the number of bits in short symbols may vary from two to more than two if necessary. This requires a more complicated state machine to track the bit savings.

In general, fixed length tables exist to produce a fixed and known bit rate/bandwidth savings, with each data value being compressed to the same number of bits. Variable length tables exist to produce the minimum bit rate and the maximum bandwidth savings possible. For quantization tables, both fixed-length and variable length tables cause a certain amount of data loss and error. In situations which require a fixed or known reduction in bandwidth, a hybrid table allows a compression system to maintain higher resolution within the reduced bandwidth. An example of such a situation is insertion of overhead information into a data stream of defined or known data size/rate/bandwidth.

FIG. 1 shows a fixed length lossy quantization table known in the art. This table has a domain of 128 (−64 to 63 inclusive) and reduces input values, for example seven-bit values, to four-bit output symbols. Each symbol represents the quantized data value. Quantization table parameters include quantization level indexes with associated decision points, reconstruction levels, and quantized output codeword symbols. The decision point sets the quantization boundary and identifies the input values for the associated output symbol (0000 . . . 1110). Input values equal to the decision point value but greater than the preceding decision point value fall into that level, are represented by the associated symbol during compression, and will be represented by the reconstruction level upon decompression. For example, level index 0 has a decision point of −50, which includes input values from −50 to −64, is represented by symbol 0000, and will be reconstructed to a value of −57. Because the symbols are four bits long in this example, there are sixteen ($2^4$) possible levels for the table. However, when the tables (both FIG. 1 and FIG. 2) represent differential pulse code modulation (DPCM) prediction error values, the tables normally have an odd number of levels (15) to maintain the symmetry inherent in the prediction error values. DPCM processing will be explained later.

Each quantization level has an average resolution of 8.5 (e.g., a domain of 128 divided by 15 levels), but any one level may actually represent more or less than the average resolution depending upon other factors unique to an individual compression/decompression network. For any given input value within the domain of the table, the input value is classified with respect to a decision point wherein the input value is less than or equal to the decision point but greater than the preceding decision point. The index of the decision point then identifies the four-bit symbol used to represent the data value. Upon dequantization, the four-bit symbol identifies an index which leads to a reconstruction value. The reconstruction value is equal to or approximately equal to the original input data value.

FIG. 2 shows a table implementing the principles of the present invention. The table has a domain of 128 (−64 to 63 inclusive) and reduces seven-bit input values to one of fourteen four-bit output symbols or one three-bit output symbol (level 7). The table has fifteen possible quantization levels, compared to a maximum of sixteen possible levels in a typical four-bit table. Unrelated to DPCM processing contained in both tables of FIGS. 1 and 2, the number of possible levels is reduced (from $2^n$ maximum) because one of the symbols (000) contains only three bits. Decreasing the number of levels within the table by one reduces maximum resolution for the table by an average of approximately 6.3% for each level. For the domain of 128, a sixteen level table has an average resolution of 8.0 for each level, and a fifteen level table has an approximate average resolution of 8.5 for each level (e.g., a domain of 128 divided by 15 levels). A three-bit table would only have eight possible levels. Using a fifteen level table instead of an eight level, three-bit table adds seven levels, and represents an average 87.5% increase in resolution for each level. If the three-bit symbol (000 in this case, for example) is placed within the fifteen level table such that it is accessed frequently, then the reduction in bandwidth and memory requirements become significant and outweigh the loss in data resolution. Thus, in accordance with the present invention, in a quantization table having N levels (e.g., 15 levels), each level having an associated output symbol of predominantly M bits (e.g., 4 bits), at least one level (e.g., level 7) is associated with a frequently occurring value and a corresponding symbol having less than M bits (e.g., 3 bits).

A decompression network must identify the three-bit and four-bit symbols when the data is retrieved for decompression. This is facilitated by reserving the bit pattern of the threebit symbol. For example, in FIG. 2 only the three-bit symbol has the pattern "000." The first three bits of all symbols are reserved such that whenever the bit pattern of "000" occurs in these bits, the network identifies the three-bit symbol and does not process a fourth bit when dequantizing and reconstructing the eight-bit data value. For all four-bit patterns of symbols any chosen three-bit pattern will occur twice. Only one of the occurrences of the three-bit symbol will represent a quantization level in a table, because the network can only recognize one level for the three-bit symbol without other information. Any three-bit pattern may be used in the case of a four-bit table, and only the three-bit symbol may have the reserved pattern.

For a given system in which the tables are used, if a designer determines that it is more efficient to use two three-bit symbols instead of one in a predominantly four-bit table, then the quantization and dequantization tables may be designed with fourteen or fewer levels. Any two-bit pattern, such as "00, " in any of the bit positions will occur only four times within the sixteen possible symbols. The twelve levels that do not have the short symbol bit pattern are assigned four-bit output symbols. Using a two-bit pattern to identify the three-bit symbol leaves one bit to distinguish between three-bit symbols which will uniquely identify two different levels. This is the same as having two unique three-bit patterns, each of which will occur twice within the sixteen possible symbols. Therefore, fourteen of the sixteen levels are available for this arrangement.

The three-bit symbol is positioned so as to optimize the chances of this symbol being associated with frequently occurring input data values during quantization. Therefore, a particular system must be evaluated in advance so as to statistically identify where to place the three-bit symbols. The system may include more than the compression/decompression network if necessary to accurately make statistical measurements. For example, the table in FIG. 2 processes Differential Pulse Code Modulation (DPCM) prediction error values typically derived from a prediction network. Such prediction networks are well known. Within compression networks utilizing DPCM, a prediction network uses previous data values to predict the next data value. The difference between the actual value and the predicted value is determined and this difference is the prediction error. The absolute value of the prediction error is generally numerically less than either the actual or predicted values, and therefore may be accurately represented with fewer bits.

DPCM prediction error values generally occur symmetrically about zero error and statistically occur more frequently at and close to zero error approximating a bell curve. The frequency of where the error values occur may be measured before the table is designed by deriving the distribution of all prediction error values which will be input into the system. With this information, a three-bit symbol is placed where the likelihood of use is the greatest, thereby minimizing bandwidth and memory requirements while maintaining processing efficiency. The resolution of the level(s) to be represented by the three-bit symbols may be adjusted to optimize the use of the three-bit symbols. In FIG. 2, the three-bit symbol is placed about zero where the prediction error is most likely to occur for this system. This particular level (level 7) has a resolution of six, from 3 to −2, because the table level placement is optimized for statistical occurrence. Again, depending upon the type of compression network involved, the placement of the three-bit symbol depends upon the statistical occurrence of data values the quantization and dequantization tables receive. The statistically optimal placement may vary between different types of systems without affecting the implementation of short codeword symbols.

The symbols may be designed to take advantage of the symmetry of the input data, such as DPCM input data represented by prediction error values, for example. The table in FIG. 2 is based on DPCM processing where the input values will occur symmetrically about zero. Therefore, one bit of the symbol may be reserved as a sign bit. The extreme right bit (the least significant bit) of symbols in levels 0 to 6 is "0", whereas this bit for symbols in levels 8 to 14 is "1" The network then must only decode three bits of the four-bit symbol upon reconstruction, and less complicated circuitry may add the correct sign to the reconstructed data value.

FIG. 3 illustrates one possible system in which quantization and dequantization tables employing the present invention may be used. Compression network 12 receives input data at its input 10 from an input network (not shown). The input data is sent to quantizer 20 and combiner 22. Quantizer 20 passes necessary input values to predictor 18 which generates a prediction value for the value being quantized. Combiner 22 receives the prediction value and subtracts it from the original input value associated with the prediction value. The difference, which is the prediction error value, is received by quantizer 20, which quantizes the prediction error value using a quantization table designed in accordance with the principles of the present invention. Compressed data output symbols from quantizer 20 are sent to frame memory 14.

When data is needed by an output network (not shown), decompression network 16 receives the compressed data from frame memory 14, and dequantizer 26 dequantizes the compressed prediction error values using a dequantization table designed in accordance with the principles of the present invention. The prediction error values pass to predictor 24, which is similar to predictor 12, and a prediction value is generated. The prediction value is sent back to dequantizer 26, and added to the decompressed prediction error value resulting in the corresponding reconstructed original input value or a close approximation thereof. The reconstructed values are sent to the output network.

The input network may be a signal processor in an MPEG compatible television receiver, which receives audio and video signals encoded and compressed in an MPEG format. The receiver decodes and decompresses the received signal and provides 8×8 blocks of eight-bit image picture elements (pixels) to input 10. The corresponding output network may be a display processor compatible with a standard or high definition display. The display processor requires random access to pixel blocks within a given image frame to derive motion compensation information. Frame memory 14 stores the image frames until the display processor needs them.

Figure 4:
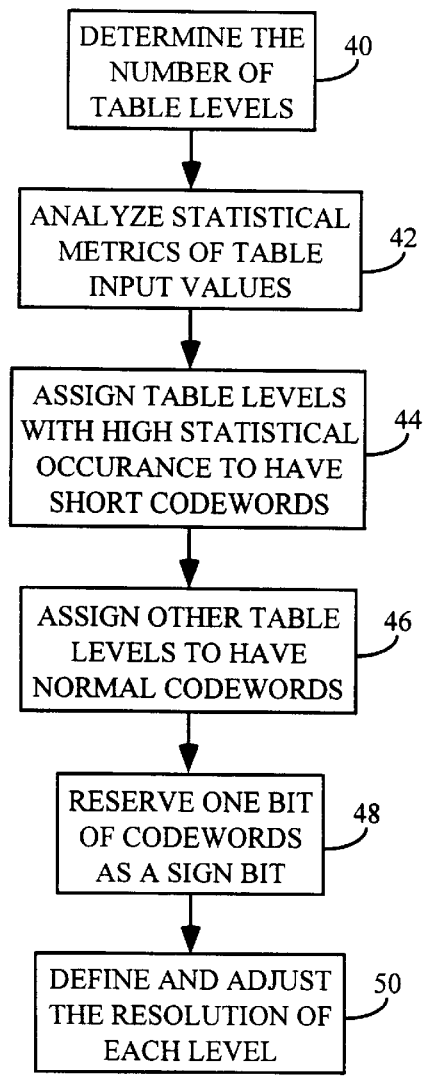
FIG. 4 shows a flow chart defining one possible method of designing a table according to the principles of the present invention.

FIG. 4 illustrates one method of designing a quantization and dequantization table for use in the network of FIG. 3 as described above. It is not necessary to follow the exact order of each step to successfully design a table. For example, step 46 may occur before step 44, and step 48 may occur at any time. In step 40, the number of levels the table will have is determined. This depends upon the number of bits each symbol will have, the type of data to be received by the table, the type of processing the network will do to the data, and other variables particular to the system employed. In step 42, the data and system are statistically analyzed to determine and classify the frequency at which input data values will occur. The table level(s) which will receive frequently occurring data is/are assigned the short symbol(s) in step 44. The other levels are assigned normal length symbols in step 46. In step 48, one bit of the symbols is reserved as a sign bit, which may be processed separately by less complicated circuitry to save and add the correct sign of the data. Finally, in step 50, the resolution of each level is defined. The levels may be adjusted so that some levels have a finer resolution than other levels. This determination is also based upon the statistical analysis of the data and system employed.

The described quantization network should not be confused with Huffman coding, which is well known to persons skilled in the art. Huffman coding is a lossless statistical entropy coding, and has codeword lengths which are both less than and greater than the average output codeword length. Also, each input into an encoder employing Huffman coding has a unique symbol generated at the output of the encoder. It is impossible to use Huffman coding in a compression system with a fixed bit rate because Huffman coding is entropy coding. Huffman coding does not provide the necessary control to provide a fixed bit rate.

The method described herein according to the present invention facilitates memory and bandwidth reduction even if the frequency of occurrence for each level is approximately equal because the method and apparatus are applied in a lossy system. Symbols according to the principles of the present invention represent a range of input data determined by decision points associated with quantization levels. The original data typically is not exactly reproduced upon decompression. Also, implementing Huffman coding instead of the method described above would result in more complicated hardware and symbol lengths longer than the average/dominant symbol size, because each codeword must have a unique pattern to differentiate between codewords. That is, if a four bit codeword was "0101," codewords with more bits could not have "0101" in the first four bits or the decoder would incorrectly identify the bit pattern. In quantization tables incorporating the invention, only the short symbol has a unique bit pattern for N bits. Longer bit patterns may be repeated after the first N bits. This requires a significantly less complicated network compared to Huffman coding.

The following is claimed:

1. A method for recompressing image representative input pixel block data comprising a fixed first number of data bits to provide recompressed pixel block data of a target fixed reduced second number of bits less than said first number, the steps comprising:

providing a hybrid quantization coding table including,
(a) a first codeword set comprising a plurality of codewords of a first fixed bit length representing a corresponding plurality of data quantization intervals of said coding table,
(b) a second codeword set including a codeword of a second fixed length shorter than said first length representing a data quantization interval of said coding table;

dynamically selecting between codewords of said first and second codeword sets in quantizing an input pixel block to provide a recompressed pixel block of said target fixed reduced second number of bits; and assigning said selected codewords to data elements of said input pixel block to provide a corresponding recompressed pixel block containing said fixed reduced second number of bits.

2. The method of claim 1, wherein said coding table includes substantially less of said codewords of said second fixed bit length than said codewords of said first fixed bit length.

3. The method of claim 1, further including the step of, employing a sign bit in said codeword of said second codeword set; and wherein said data quantization intervals of said first codeword set increase non-linearly.

4. The method of claim 1, wherein:

said codeword of said second codeword set contains a predetermined bit pattern in the initial bit sequence of said codeword.

5. The method of claim 1, wherein:

said codeword of said second codeword set is one bit less than said said codewords of said first codeword set.

6. A system for recompressing image representative input pixel block data comprising a fixed first number of data bits to provide recompressed pixel block data of a target fixed reduced second number of bits less than said first number, comprising:

an input network for receiving data and formatting said data;

a compression network including a compression table for compressing said data into compressed data, said compression table including
(a) a first codeword set comprising a plurality of codewords of a first fixed bit length representing a corresponding plurality of data quantization intervals of said coding table, (b) a second codeword set including a codeword of a second fixed length shorter than said first length representing a data quantization interval of said coding table; and memory for storing said compressed data; wherein means for dynamically selecting between codewords of said first and second codeword sets in quantizing an input pixel block to provide a recompressed pixel block of said target fixed reduced second number of bits.

7. The system of claim 6, further comprising:

a decompression network including a decompression table for receiving said compressed data and producing reconstructed data; and an output network for receiving said reconstructed data.

8. The system of claim 6, wherein:

a predetermined bit pattern of bits of each of said codewords is associated with a quantization level index and reconstruction level value.

9. The system of claim 6, wherein said codeword of said second codeword set contains a unique, predetermined bit pattern in the initial bit sequence of said codeword.

10. A method for processing coded image representative data, the steps comprising:

(a) decompressing said coded image representative data to produce decompressed data;

(b) recompressing said decompressed data to provide recompressed pixel block data of a target fixed reduced number of bits; and (c) storing said recompressed pixel block data; wherein said recompressing step involves dynamically selecting between codewords of different length associated with first and second codeword sets in quantizing an input pixel block to provide a recompressed pixel block of said target fixed reduced number of bits.

11. The method of claim 10, wherein;

the number of codewords associated with said second codeword set is substantially less than the number of codewords associated with said first codeword set.

12. The method of claim 10, wherein:

said coded image representative data represents differential values.

13. The method of claim 10, including the step of, assigning selected codewords to data elements of said decompressed data to provide a recompressed pixel block containing said fixed reduced second number of bits.

14. The method of claim 10, wherein:

said coded image representative data comprises pixel blocks.

15. The method of claim 10, wherein:

said recompressing step includes quantizing using a fixed-length quantization table.

16. The method of claim 10, wherein:

a codeword of said second codeword set contains a predetermined bit pattern in the initial bit sequence of said codeword.

17. The method of claim 10, wherein:

a codeword of said second codeword set has one less bit than codewords of said first codeword set.

18. The method of claim 10, further including steps comprising:

(d) decompressing said recompressed pixel block data to produce reconstructed data; and (e) outputting said reconstructed data to an output network; wherein said reconstructed data is generated in a substantially inverse manner to said recompression step.

* * * * *